Sept. 26, 1933.  G. WATCHORN  1,928,342

CHECKROW WIRE STAKE

Filed Oct. 7, 1930  2 Sheets-Sheet 1

Inventor
G. Watchorn
By *Arthur H. Sturges*
Attorney

Sept. 26, 1933.  G. WATCHORN  1,928,342
CHECKROW WIRE STAKE
Filed Oct. 7, 1930  2 Sheets-Sheet 2
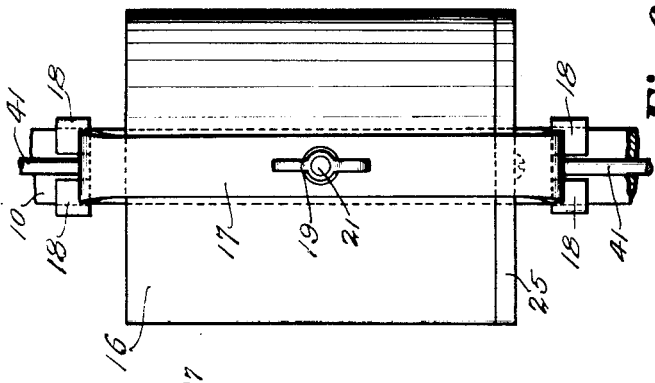
Fig. 6.
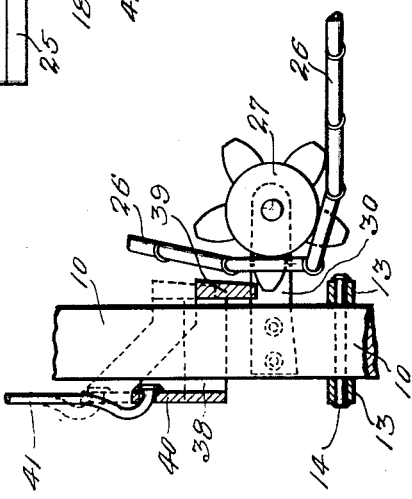
Fig. 5.
Fig. 4.
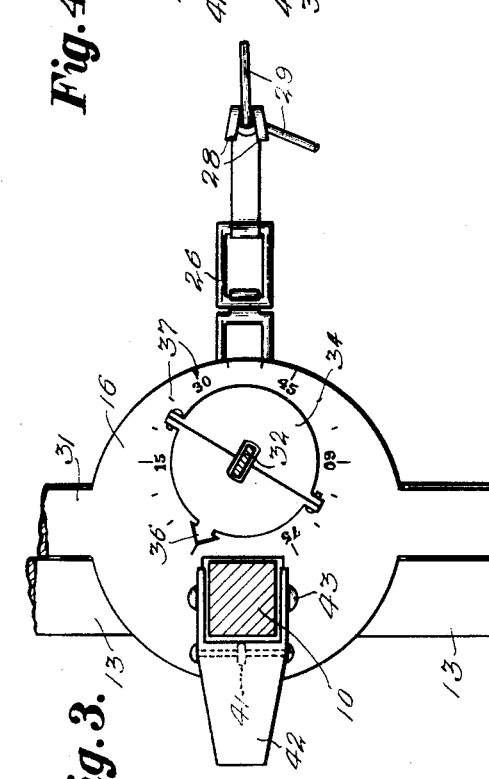
Fig. 3.
Inventor
G. Watchorn
By Arthur H. Sturges
Attorney Patented Sept. 26, 1933

1,928,342

UNITED STATES PATENT OFFICE 1,928,342

CHECKROW WIRE STAKE

George Watchorn, Leigh, Nebr.

Application October 7, 1930. Serial No. 487,031

6 Claims. (Cl. 111—49)

The present invention relates to stakes adapted for use in holding check row wires for use in connection with corn seed planters and the like.

An object of the present invention is to provide a stake equipped with means for determining the pressure placed upon the check row wire when drawn taut so that a desired predetermined pressure or tension may be placed on the wire each time the stake is set up and to thus insure the uniform operation of the planter, particularly to obtain uniform tension of the wire in cross check work.

Another object of the invention is to provide a check row wire stake with means for facilitating the positioning of the stake in the ground and with means for engaging the end of a check row wire and drawing it taut to the desired predetermined tension and locking the check row wire to the stake automatically to maintain the wire in the correct adjusted position.

The invention further aims at the provision of the stake embodying the above characteristics and which has means for quickly and easily releasing the tension on the wire when it is desired to reset the stake.

A further object of the invention is to provide a stake of this character with means for drawing the wire taut by an upward pull on the mechanism carried by the stake and to provide the stake with foot engaging means for retaining it in position during the said upward pull and for locking the device when raised to desired extent.

With the foregoing and other objects in view, the invention will be more fully described hereinafter, and will be more particularly pointed out in the claims appended hereto.

In the drawings, wherein like symbols refer to like or corresponding parts throughout the several views.

Figure 3 is an enlarged fragmentary top plan view of the stake with a portion of the upper end thereof removed.

Figure 4 is a fragmentary transverse section taken substantially on the line 4—4 of Figure 2.

Figure 5 is a fragmentary sectional view taken through the intermediate portion of the stake showing the automatic locking means for the wire pulling device, and Figure 6 is an enlarged fragmentary side elevation of the rear side of the stake, showing the wire pulling device.

Figures 1, 2:
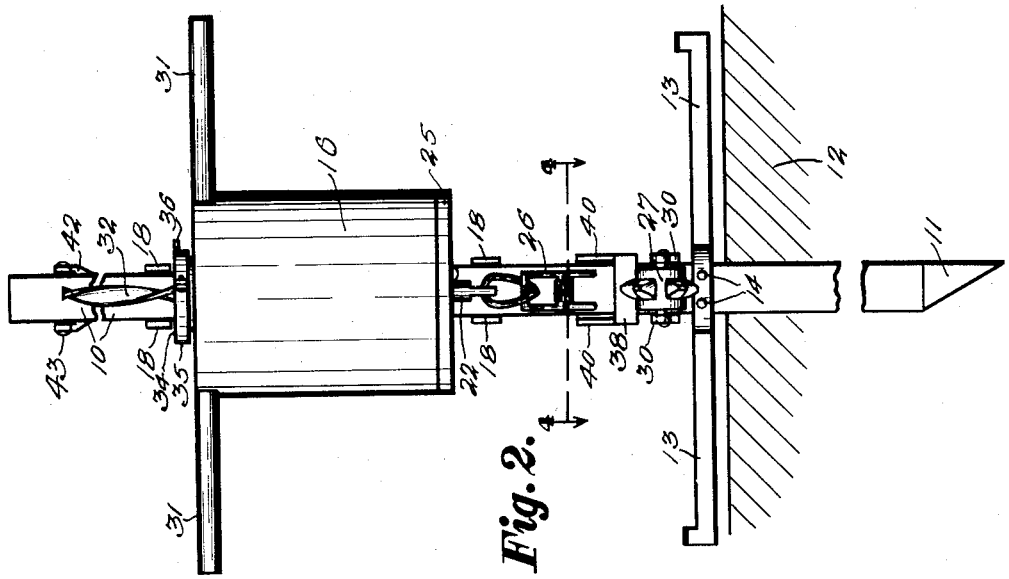
Figure 1 is a side elevation, partly in section, of a stake constructed according to the present invention and as mounted in the ground.
Figure 2 is a front elevation of the same.

Referring now to the drawings, 10 designates the body of the stake which is of desired length and which is preferably rectangular in cross section although it may be given any desired cross sectional configuration. The lower end of the stake is provided with a penetrating point 11 adapted to enter, under pressure, the ground 12.

The stake is provided in spaced relation to its lower end 11 with a foot piece 13 in the form of a bar which is preferably enlarged and apertured intermediate its ends for the stake 10 to pass therethrough and with the ends of the bar projecting outwardly in opposite directions from the opposite sides of the stake. The bar 13 is secured by rivets 14 or the like to the stake at the desired height thereon. The ground penetrating portion of the stake is disposed beneath the bar 13 and the latter is adapted to receive pressure of the feet for forcing the stake 10 into the ground at the desired point, the bar 13 also acting as a gauge to limit the downward movement of the stake.

For the purpose of transporting the stake and of handling it in adjusting the same to the desired point of penetration, the upper end of the stake may be provided with a rearwardly extending handle 15. A housing 16 is provided in its upper and lower ends with registering apertures of a configuration adapted to slidably receive a stake 10 therethrough and the housing 16 is frictionally held in adjusted position along the stake by means of a bow spring 17 arranged at the rear side of the stake and provided at opposite ends with flanged shoes 18 shaped to the configuration of the rear and lateral faces of the stake for driving the bow spring and holding it firmly in position on the stake.

The shoes 18 are arranged beyond the lower and upper ends of the housing 16 and the spring is compressed between the housing 16 and the stake 10 by means of a wing nut 19 acting against a coil spring 20 carried about a threaded bolt 21 which is carried by the adjacent rear wall of the housing 16 and which slidably engages through the intermediate portion of the bow spring 17.

The housing 16 is arranged in offset relation to the post 10 with the major portion of the housing projecting from the front side of the post. In the offset portion of the housing 16 is slidably and vertically disposed a bolt 22 about which is fitted an expanding spring 23. The upper end of the bolt carries a disc 24 which bears against the upper end of the spring 23 while the lower end of the spring is seated against a removable bottom plate 25 for the housing 16. The bolt 22 is thus urged normally upward within the housing.

The lower end of the bolt 22 projects through the bottom plate 25 and is connected to a flexible connector in the form of a chain 26 which is carried downwardly at the forward side of the post and under a sprocket wheel 27, the free end of the chain 26 having a forked hook 28 thereon adapted to interlock with the links 29 on the end of a check row wire adapted to be drawn taut and supported.

The sprocket wheel 27 is carried in a bracket 30 mounted on the stake 10 and spaced a short distance therefrom to provide a clearance between the sprocket wheel 27 and the front side of the stake or post 10. The housing 16 is provided at its upper end with a pair of oppositely and laterally extending handles 31 by means of which the housing may be drawn upwardly on the stake 10 against the tension of the bow spring 17, the latter holding the housing at the desired height.

The bolt 22 carries upon its upper end and above the disc 24 a spiral section or blade 32 which extends through a circular opening in the top of the housing 16 to admit of the free vertical movement of the spiral blade 32 with the bolt 22. Disposed on the upper end of the housing 16 and concentric to the blade 32 is an annular outwardly overhanging flange or track 33 supporting a two-part cap 34. The cap 34 is of substantially disc form with a depending and inturned flange 35 adapted to engage beneath the overhanging flange of the track 33 to hold the cap 34 to the track and permit of the free turning of the cap thereon.

At the meeting inner marginal edges of the cap sections, the latter are provided with complemental groove portions conforming in contour to the cross sectional configuration of the spiral blade 32, as shown clearly in Figure 3 so that vertical movement of the spiral blade 32 causes the cap 34 to turn on its annular track 33. The cap 34 is provided at one side with a radially projecting indicator 36 adapted to traverse a circular row of pressure indices 37 indicative of pounds pressure imposed by the spring 23 during the upward pull on the housing 16 when the chain 26 is connected to the check row wire.

Means is provided for locking the chain 26 in taut position after it has been drawn upward to the desired extent. This locking means comprises a sleeve 38 slidable upon the intermediate portion of the stake or post 10 between the housing 16 and the bracket 30. At the forward side, the sleeve 38 carries a depending dog 39 of suitable size to fit between the front side of the stake 10 and the teeth of the sprocket wheel 27 so as to jam therebeween and hold the wheel 27 against turning in a direction to free the chain 26, the weight of the sleeve 38 being adapted to automatically urge the dog 39 into wedged or locking position.

The rear side of the sleeve 38 is provided with an upwardly extending lug 40 adapted to counterbalance the dog 39 so that the sleeve 38 may have free sliding movement upon the stake 10, and to also serve as a pivotal connection with the lower end of a rod 41 which is carried upwardly through the ends of the bow spring 17 and through the adjacent portions of the housing 16. The upper end of the rod 41 is pivotally connected to a latch lever 42 which is pivotally and slidably connected by a pin 43 to the upper end of the stake 10 at a point below the handle 15.

In use, the stake is transported and otherwise manipulated by means of the handle 15 and to properly position the penetrating point 11 of the stake at the desired point on the ground 12 in which the stake is to be mounted. The operator now places his feet on the cross bar 13 and by means of his weight drives the lower portion of the stake into the ground as shown in Figures 1 and 2. The check wire links 29 are now drawn up roughly into position and selectively interlocked with the hook 28 as shown in Figure 3. The operator now, with feet on the bar 13, grasps the handles 31 and draws the housing 16 upwardly on the stake or post 10. The tension of the housing 16 on the post may be regulated by manipulating the wing nut 19 so that the housing 16 will remain in adjusted position without vibrating or running downwardly on the stake.

The housing 16 is drawn upwardly and the coupling chain 26 is pulled upwardly over the sprocket wheel 27, turning the latter so as to raise the dog 39 with its sleeve out of locking position so that the chain 26 may move freely upward and draw the check row wire taut. The pressure or tension exerted upon the check row wire is determined by the indicator 36 of the cap 34 because as the bolt 22 is pulled down through the housing 16 against the tension of the spring 23, the spiral blade 32 is drawn downwardly through the cap 34 and causes the same to rotate a distance proportional to the longitudinal movement of the bolt. As the lower end of the bolt 22 is connected to the chain 26, the bolt is held from turning, and this action is also effected by the frictional contact of the disc 24 of the bolt with the upper end of the spring 23. Thus, a predetermined tension may be placed upon the check row wire as will be shown on the scale 37 so that each time the stake is set up and used the said predetermined tension may be had.

When the handles 13 are released and the housing 16 is permitted to recede or move downwardly on the stake 10, the sleeve 38 falls by gravity and engages the locking dog 39 with the teeth of the sprocket wheel 27 so as to jam the dog between the wheel and the stake and lock the sprocket wheel against turning. The sprocket wheel thus holds the connecting chain 26 against outward movement and consequently maintains the check row wire taut.

When it is desired to reposition the stake it is only necessary that the operator raise the latch lever 42 to lift the sleeve 38 and release the dog 39 from engagement with the sprocket wheel 27. Under the tension of the check row wire the connecting chain 26 is thus drawn out and the housing 16 is drawn down so that the check row wire is released and may be uncoupled from the hook 28.

It is desirable to stretch the check wire in order to have the planter function to the best advantage. It will be understood that it is conventional and necessary to provide the same degree of stretch upon the check wire under ordinary conditions, and it is absolutely necessary to maintain this degree constant in order to obtain a uniform cross check. As heretofore practiced this was done by hand, thus providing an unreliable method subject to human variations. Furthermore in planting over hilly or rolling land it is sometimes necessary to reduce or increase the tautness of the wire. With this invention a more gradual increase or reduction can be obtained, and under ordinary conditions a set degree of tautness may be maintained at all times, thus avoiding variations due to personal misjudgment.

It is obvious that by the foregoing means the operator may selectively stretch the check wire to any degree of tautness.

It is obvious that the bow spring 17 is adjustable as to tension and prevents the free unrestrained movement of the housing 16 upon the stake 10, and only when direct force is exerted will the housing 16 have sliding movement upon the stake. A stake is employed at each end of the check row wire.

As the operator moves his machine from one side of the cornfield to the other he moves the stakes which are in staggered relation with respect to each other, namely, stakes are at one end of the corn rows being planted while the opposing stakes are at the end of corn rows already planted.

From the foregoing description it is thought to be obvious that a check row wire stake constructed in accordance with my invention is particularly well adapted for use by reason of the convenience and facility with which it may be assembled and operated, and it will also be obvious that this invention is susceptible of some change and modification without departing from the principles and spirit thereof, and for this reason I do not wish it to be understood as limiting myself to the precise arrangement and formation of the several parts herein shown in carrying out my invention in practice except as herein claimed.

What is claimed is:—

1. A stake for check row wires comprising a post, a traveler mounted on the post and adapted to be moved upwardly, a connecting member carried by the traveler for engagement with the end of a check row wire for drawing the same taut by the movement of the traveler, direction changing means on the post beneath the traveler and engaging the connecting member to change the upward pull of the traveler into a longitudinal pull on the check row wire, means connected to the traveler for indicating the tension placed on the check row wire, and automatic locking means for said connecting member to hold the same in adjusted position to keep the check row wire taut.

2. A stake for check row wires comprising a post, a traveler mounted on the post and having handles for moving the traveler upwardly, a flexible connector carried by the traveler and adapted to be attached to the end of a check row wire for drawing the latter by the upward movement of the traveler, direction changing means on the post beneath the traveler and engaging the connecting member to change the upward pull of the traveler into a longitudinal pull on the check row wire, tension indicating means carried by the traveler for showing the degree of tension placed on said wire, gravity actuated locking means carried by the post for engagement with said connector to hold the same from backward movement when the wire is placed under tension, and manual means for releasing said gravity actuated locking means.

3. A stake for check row wires comprising a post, a traveler on the post having handles for drawing said traveler upwardly on the post, a slidable element mounted in the traveler, a spring in the traveler connected to said slidable element for normally maintaining the same in a definite position within the traveler, a chain connected to said slidable element and adapted for engagement with an end of a check row wire for drawing the latter taut upon the upward movement of the traveler, direction changing means on the post beneath the traveler and engaging said chain for changing the upward pull of the traveler into a longitudinal pull on the check row wire, indicating means carried by the traveler and connected to said slidable element for movement thereby to indicate the shifting of the slidable element against the tension of said spring, and means for locking said chain against outward movement when adjusted.

4. A stake for check row wires comprising a post, a traveler mounted on the post and having handles for moving the traveler upwardly on the post, a bolt slidably mounted in the traveler, a chain connected to the lower end of the bolt and adapted for engagement with the end of a check row wire, a spring in the traveler engaging the bolt for normally urging the same upwardly in the traveler, means connected between the traveler and the bolt for indicating shifting of the bolt against the tension of the spring to show the tension placed on said wire, a toothed wheel carried by the post and engaging said chain, a gravity lock carried by the post for engagement with the toothed wheel at the outer side of the chain for locking the chain and wheel against outward movement, and manual means for releasing said lock for freeing the wire.

5. A stake for check row wires comprising a post, a traveler slidably mounted on the post, adjustable tension means for the traveler to yieldingly hold the same in adjusted position on the post, a yieldable bolt carried in the traveler, a chain connected to the lower end of the bolt and adapted for engagement with an end of a check row wire, a sprocket wheel carried by the post and engaging the chain to maintain the same in closely spaced relation to the lower end of the post, a sleeve slidable on the post and having a depending dog adapted to jam between the wheel and the post to hold the wheel and chain against outward movement when placed under tension, and tension indicating means connected between the bolt and the traveler for showing the relative movement between the bolt and the traveler and determining the tension placed on said wire.

6. A stake for check row wires comprising a post, a housing slidably mounted on the post, a tension spring adjustably mounted on the housing having shoes at opposite ends slidably engaging the post for yieldably holding the housing at the desired height on the post, a bolt slidably mounted in the housing, a spring in the housing connected to the bolt for normally holding the same in raised position, a spiral blade carried on the upper end of the bolt and projecting through the top of the housing, a cap rotatably mounted on the upper end of the housing and having indicating means co-operating with the housing to show compression of the spring and provided with a central noncircular opening fitting said spiral blade for turning the cap upon the longitudinal shifting of the bolt and blade through the housing, a chain connected to the lower end of the bolt, a sprocket wheel carried upon the lower end of the post and engaging said chain, a gravity actuated sleeve mounted on the post and having a locking dog adapted to engage said sprocket wheel for locking the same against turning to free the chain, said chain adapted for connection with one end of a check row wire and said housing adapted to be drawn upwardly on the post for placing said wire under tension, a rod connected to said sleeve and extending upwardly at the side of the post, and a latch lever on the upper end of the post connected to said rod for raising said sleeve and releasing the chain to free said wire.

GEORGE WATCHORN.